S. SCHURCH, Jr., & F. L. COOPER.
Machine for Cutting Meat or Vegetables.
No. 212,113. Patented Feb. 11, 1879.
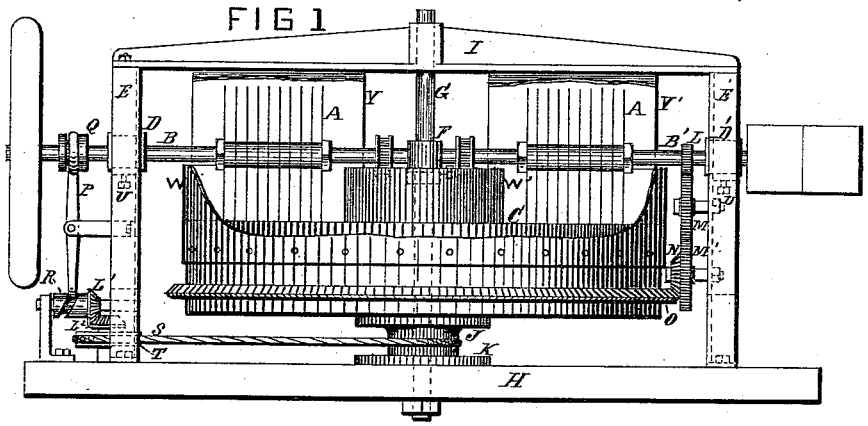
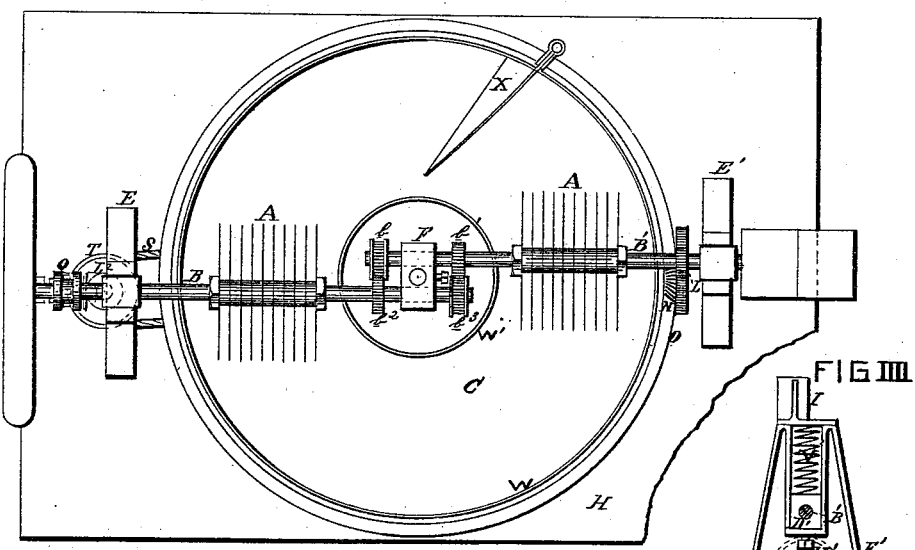
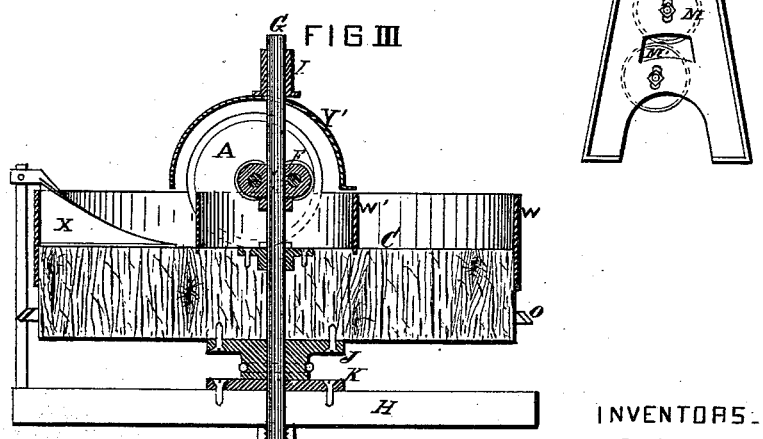
WITNESSES.
Alex H. Morgan
J. Elliott Shaw
INVENTORS.
Samuel Schurch, Jr.
Francis L. Cooper,
By their Attorney, Isaac R. Oakford

UNITED STATES PATENT OFFICE.

SAMUEL SCHURCH, JR., AND FRANCIS L. COOPER, OF PHILADELPHIA, PA.

IMPROVEMENT IN MACHINES FOR CUTTING MEAT OR VEGETABLES.

Specification forming part of Letters Patent No. 212,113, dated February 11, 1879; application filed August 23, 1878.

*To all whom it may concern:*

Be it known that we, SAMUEL SCHURCH, Jr., and FRANCIS L. COOPER, of the city and county of Philadelphia, and State of Pennsylvania, have invented a new and useful Improvement in Machines for Cutting Meat or Vegetables, which improvement is fully set forth in the following specification and accompanying drawings, in which—

Figure 1 is a side elevation of our improvement in machines for cutting meat or vegetables. Fig. 2 is a plan view of the same, with a portion removed in order to more fully exhibit the working parts. Fig. 3 is a vertical transverse section of the same. Fig. 4 is a side view of one of the standards for supporting the knife shafts and gearing.

Our invention consists of a series of revolving cutters, placed upon two separate shafts, with intervening washers to regulate their distance apart, and operated in conjunction with a rotating block, upon which the meat to be cut is placed. The shafts carrying the cutters are supported in fixed bearings, and are driven at an increased speed over that of the rotating block beneath, by which means the edges of the knives are caused to act with a draw-cut.

Our invention further consists of a device for shifting the shafts carrying the knives in and out longitudinally, in order to change the position of the cutters, so as to cause the knives to act at different points on the meat as it is carried around on the block, and thus facilitate the cutting operation, and also to avoid forming circular grooves in the surface of the block, which would otherwise occur if the knives always revolved in the same vertical plane. The knife-shafts are also arranged for vertical adjustment, so that if occasions require—as, for instance, in cutting vegetables—the cutting-edges of the knives may be raised slightly above the surface of the block, or, if the block wears away, the shafts and knives may be lowered.

The principal object of our invention is to produce a machine for cutting meats or vegetables to be driven by hand or steam power, in which the knives will act with a draw-cut, and sever the meat effectually and speedily.

The construction of the machine is also simple and durable, and the meat or vegetables cut upon it are not injured in the least, which is not the case with the machine heretofore in use, in which vertical reciprocating knives are used. In the machine with vertically-moving knives the meat is reduced to the required fineness by chopping. This operation of the knives, continually pounding and striking the meat, produces considerable friction, and has a tendency to heat and discolor the meat. As the knives strike with considerable force, the machine is subjected to a severe jar and strain, and requires continual repairing and attention to keep it in order; whereas in the machine as constructed by us the knives cut their way through the meat cleanly and smoothly, with less noise or strain on the machine, thus permitting the meat to be cut more rapidly, and the machine run at considerable less expense.

A A, Figs. 1, 2, and 3, are a series of circular knives fixed on the shafts B and B', with intervening washers to regulate their distance apart. The shafts B and B' are located to the right and left of the center, and parallel to the surface of a rotating block, C, with the outer ends, which extend beyond the block, mounted in bearings D and D', which are supported in standards E and E', and the inner ends supported upon a bracket, F, secured to a vertical rod, G.

In order to communicate motion from one shaft to the other, and cause them to revolve steadily in opposite directions, the inner ends of the shafts are furnished with pinions $b$, $b^1$, $b^2$, and $b^3$, which gear by pairs into each other, as shown in Fig. 2. Two of the said pinions, $b$ and $b^3$, are also made with side flanges, between which the opposite wheels work, so as to convey a longitudinal sliding movement in and out from one shaft to the other.

The vertical rod G, which passes through the center of the rotating block C, and serves as an axis for the same, is secured at the lower end to the base H of the machine, with the upper end held in position by means of the cross-bar I, which is secured to the standards E and E', as shown in Figs. 1 and 3. The under side of the rotating block C is furnished with a hub, J, which rests and revolves upon a circular plate, K, fastened to the base H; as shown in Figs. 1 and 3. Motion is communicated from the shaft B′ to the rotating block by means of a pinion, L, spur-wheels M and M′, and bevel-pinion N, which gears with a bevel-wheel, O, surrounding the block. The speed of the gearing is arranged so that the block will make a reduced number of revolutions to that of the knives in or about the proportion of one turn of the block to six of the knives. On one side of the machine a mechanism for shifting the knives is arranged. This consists of a lever, P, connected at the upper end to a clutch, Q, on the shaft B, and operated at the lower end by means of a grooved cam wheel or cylinder, R, which throws the lever in and out. Motion is conveyed to this cam wheel or cylinder through bevel-gearing $L^1$ and $L^2$ and a belt, S, which passes around a groove in the rotating hub J and over a pulley, T, on the stud, which carries the bevel-wheel $L^2$. The bearings D and D′, which carry the outer ends of the shafts B and B′, are arranged for vertical adjustment in slots formed for the purpose in the standards E and E′, the proper adjustment being made by means of set-screws U U′ at the bottom of each bearing. Spiral springs V′, Fig. 4, are also placed over each bearing, to permit the shafts to yield sufficiently to prevent injury in case any hard substance should get under the knives. Raised outer and inner bands, W and W′, are secured to the rotating block to keep the meat or vegetables from falling off, and to retain the materials in proper position for the knives to act on. A stationary curved scraper, X, is also placed inside of the outer band, in close proximity to the surface of the block, so as to catch and throw the materials inward toward the knives. Y and Y′ are semicircular hoods or coverings, of sheet-iron, secured to the cross-bar I, so as to inclose the knives, to guard against accidents and protect the cutting-edges.

The meat to be cut is placed on the slowly-rotating block C, and is carried around repeatedly under the rapidly-revolving knives A A, which act with a draw-cut and sever the meat quickly and cleanly. The knives at the same time are moved slightly in and out by the shifting device above described, and act at different points on the meat. This continual change of position of the knives and points of contact with the surface of the block causes a more even wear of the block, and also minces the meat more effectually.

Having thus described our invention, what we claim as new, and desire to secure by Letters Patent, is—

1. The combination of the circular cutters or knives A A and shafts B B′, located to the right and left of the center of the machine, with the inner ends of the shafts provided with pinions $b$, $b^1$, $b^2$, and $b^3$, which gear by pairs into each other, substantially as and for the purpose shown and described.

2. The combination of the revolving knives A A, rotating block C, shafts B B′, pinion L, spur-wheels M M′, bevel-pinion N, and bevel-gear wheel O, substantially as and for the purpose shown and described.

3. The combination of the shafts B and B′, clutch Q, lever P, cam wheel or cylinder R, bevel-gearing $L^1$ and $L^2$, pulley T, belt S, hub J, and rotating block C, substantially as and for the purpose set forth.

4. The revolving cutters A A and shafts B B′, arranged to move longitudinally, in combination with the rotating block C, in the manner and for the purpose shown and described.

5. The combination, in a machine for cutting meats and vegetables, of the revolving knives A A, shafts B and B′, gear-wheels $b$, $b^1$, $b^2$, and $b^3$, bracket F, bearings D and D′, standards E and E′, vertical rod G, rotating block C, hub J, bevel-gear wheel O, bevel-pinion N, spur-wheels M and M′, pinion L, belt S, pulley T, bevel-gearing $L^1$ and $L^2$, cam wheel or cylinder R, lever P, and clutch Q, all operating substantially as herein shown and described.

SAMUEL SCHURCH, Jr.
FRANCIS L. COOPER.

Witnesses:
ISAAC R. OAKFORD,
ALEX. H. MORGAN.